United States Patent Office 3,091,609
Patented May 28, 1963

3,091,609
NEW 16-SUBSTITUTED 1,3,5(10)-ESTRATRIENES
Robert E. Schaub, Paramus, and Martin J. Weiss, Oradell,
N.J., assignors to American Cyanamid Company, New
York, N.Y., a corporation of Maine
No Drawing. Filed Dec. 20, 1961, Ser. No. 160,951
6 Claims. (Cl. 260—239.5)

This invention relates to new steroids of the estrone series. More particularly, it relates to 3-lower alkoxy-17-oxo-1,3,5(10)-estratrienes.

The novel steroids of the present invention may be illustrated by the following structural formula:

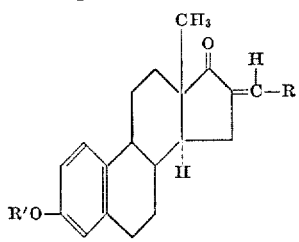

where R' is a lower alkyl radical and R is a radical selected from the group consisting of lower alkylthio, halogen, amino, lower alkylamino, dilower alkylamino, lower alkoxyamino, cycloalkylamino, mononuclear arylamino, pyridylamino, pentamethyleneimino, oxapentamethyleneimino, dilower alkylamino lower alkylamino, lower alkyl halide salts and mineral acid addition salts thereof, 1-(2'-pyridyl)piperazinyl, 3-lower alkoxy-17-oxo-1,3,5(10)-estratriene - 16 - ylidenemethylthio and N-[3-lower alkoxy-17-oxo-1,3,5(10)-estratrien - 16 - ylidenemethyl]azapentamethyleneimino radicals.

In the compounds of the present invention wherein R' is a lower alkyl group, examples of R' are methyl, ethyl, propyl, butyl, pentyl, hexyl and the branched chained isomers thereof. Examples of lower alkylamino and di-lower alkylamino represented by R are methylamino, dimethylamino, ethylamino, diethylamino, methylethylamino, propylamino, dipropylamino, ethylpropylamino, butylamino, dibutylamino, propylbutylamino, pentylamino, dipentylamino, butylpentylamino, hexylamino, dihexylamino, etc.

The starting reactants for the preparation of the compounds of the present invention are 3-lower alkoxy-16-hydroxymethylene - 17 - oxo-1,3,5(10)-estratrienes. The reaction, generally, can be illustrated by the following equation, although there are exceptions as shown hereinafter.

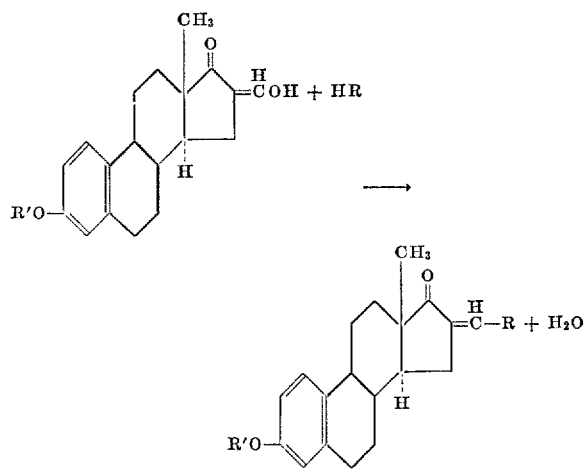

wherein R and R' are as defined hereinbefore.

The compounds used as reagents and illustrated by HR above can be, for example, lower alkyl alkanols such as ethanol, methanol, propanol, etc. They can also be lower alkyl mercaptans, such as methyl mercaptan, ethyl mercaptan, propyl mercaptan, and butyl mercaptan. Other reagents such as potassium thioacetate, sodium thioacetate, thionyl chloride, etc. can be used as shown hereinafter in the examples. The present compounds can also be prepared using amines such as amomnia, methylamine, dimethylamine, methoxyamine, piperidine, cyclohexylamine, aniline, morpholine, piperazine, 2-aminopyridine, 2-dimethylaminoethylamine, 4-(2-pyridyl)-piperazine, or the like.

When a steroid starting compound such as a 3-lower alkoxy - 16 - hydroxymethylene-17-oxo-1,3,5(10)-estratriene is reacted with piperazine, the product obtained is a di-substituted piperazine in which R in the above formulas is an N-[3-lower alkoxy-17-oxo-1,3,5(10)-estratrien-16-ylidenemethyl]azapentamethyleneimino radical. In a similar manner, when a steroid starting compound such as described immediately above is reacted with, for example, potassium thioacetate the product obtained is a sulfide wherein R is a 3-lower alkoxy-17-oxo-1,3,5(10),16-ylidenemethylthio radical.

The foregoing condensations can generally be effected by heating at reflux for about 2 to 72 hours, usually 24–28 hours, the 3-lower alkoxy-16-hydroxymethylene-17-oxo-1,3,5(10)-estratriene steroid starting compound with a small stoichiometric excess (ordinarily about 10%) of the lower alkyl alkanol, sulfur containing reagent or amine (as hereinabove defined) in a solvent such as ethanol or benzene. When using certain of the reagents such as lower alkyl alkanols and lower alkyl mercaptans, it is advantageous to carry out the condensation in the presence of an acid catalyst such as para-toluene-sulfonic acid; with a halogen-introducing reagent such as thionyl chloride an excess of the reagent may serve as solvent.

The products may usually be isolated by concentrating the reaction mixture to the point where solids begin to appear, chilling and then separating the crude product by filtration. The crude products thus obtained may then be recrystallized from acetone-petroleum ether solution, methylene chloride-ether solution or the like.

The compounds of this invention are estrogenic agents and may be used in estrogenic replacement therapy. They are also anti-cholesteremic agents and as such may be used to combate antherosclerosis. The compounds can be in such pharmaceutical forms as tablets, capsules, pills, etc. They can be combined with inert fillers, diluents, excipients and ingredients necessary in the preparation of pharmaceutical formulations. The ingredients can be treated to form long acting granules which in turn are tableted, encapsulated or otherwise prepared for ultimate pharmaceutical use.

The following examples illustrate in detail the preparation of specific compounds within the scope of the present invention.

EXAMPLES 1–12

*Condensation of Amines With 16-Hydroxymethylene-estrone 3-Methyl Ether*

A solution or suspension of 16-hydroxymethylene-estrone 3-methyl ether [J. C. Bardham, J. Chem. Soc., 1848 (1936)] in 35 cc. of absolute alcohol or benzene per 0.003 mole of steroid and a slight excess of amine is refluxed for several hours. The solution shows a negative test with 1% ethanolic ferric chloride solution. Concentration or dilution with water precipitates the aminoethylene steroid. The product is collected and recrystallized. The products obtained by this general procedure are shown in Table I.

TABLE I

| Product name | Reagent | Reaction time (hours) | Reaction solvent | Recrystn. solvent | Yield percent | M.P., °C. | Anal. M.P., °C. | $[\alpha]_D^{25°}$ | Conc. solvent |
|---|---|---|---|---|---|---|---|---|---|
| (1) 16-piperidinomethylene-estrone methyl ether. | Piperidine | 22 | Absolute alcohol. | Acetone-pet. ether (B.P. 60-70). | 96 | 183-186 | 184-186 | +218 | 1.1% in CHCl₃ |
| (2) 16-morpholinomethyl-eneestrone methyl ether. | Morpholine | 24 | ..... do ..... | ..... do ..... | 94 | 195-198 | 198-200 | +204 | 1.3% in CHCl₃. |
| (3) 16-anilinomethylene-estrone methyl ether. | Aniline | 48 | ..... do ..... | Acetone-pet. ether. | 93 | 171-173 | 172-174 | +47 | 0.6% in CHCl₃. |
| (4) 16-aminomethylene-estrone methyl ether. | Ammonia | 72 | Methanol | ..... do ..... | 68 | 204-206 (dec.) | 210-212 (dec.) | +95 | 0.9% in CHCl₃. |
| (5) 16-N,N-diethylamino-ethylamino methylene-estrone methyl ether. | N,N-diethyl ethylene-diamine. | 72 | Absolute alcohol. | | 84 | | | +69 | 1.4% in CHCl₃. |
| (6) 16-methylaminomethyl-eneestrone methyl ether. | Methylamine | 48 | Methanol | Ethanolmethylene chloride. | 60 | 220-222 | 220-222 | +111 | 0.8% in CHCl₃. |
| (7) 16-(2-pyridylamino-methylene)estrone methyl ether | 2-amino-pyridine. | 48 | Absolute alcohol. | Acetone-pet. ether. | 82 | 189-191 | 194-196 | +53 | 0.7% in CHCl₃. |
| (8) 16,16'-(piperazin-1,4-diyldimethylidyne) diestronedimethyl ether | Piperazine hydrate | 20 | Benzene | Methylene chloride-ether | 48 | 320 (dec.) | 325 (dec.) | +267 | 0.6% in CHCl₃. |
| (9) 16-[4-(2-pyridyl)-1-piperazinyl methylene]-estrone methyl ether | 1-(2'-pyridyl) piperazine | 20 | Absolute alcohol | ..... do ..... | 33 | 178-179 | 178-180 | +188 | 0.9% in CHCl₃. |
| (10) 16-cyclohexylamino-methyleneestrone methyl ether | Cyclohexyla-mine | 48 | ..... do ..... | ..... do ..... | 83 | 169-171 | 170-172 | +93 | 0.5% in CHCl₃. |
| (11) 16-diethylaminometh-yleneestrone methyl ether | Diethyl-amine | 22 | ..... do ..... | Ether-pet. ether (B.P. 60-70) | 90 | 143-145 | 144-146 | +184 | 0.7% in CHCl₃. |
| (12) 16-methoxyamino-methyleneestrone methyl ether | Methoxy-amine hydrochloride, sodium acetate | 1 | ..... do ..... | Acetone-pet. ether (B.P. 60-70) | 70 | 133-136 | 145-147 | +149 | 0.6% in CHCl₃. |

EXAMPLE 13

*Preparation of 16,16'-(Thiodimethylidyne)-Diestrone Dimethyl Ether*

By the general procedure of Examples 1–12, 16-hydroxymethyleneestrone 3-methyl ether is heated with potassium thiolacetate to give 16,16'-(thiodimethylidyne)-diestrone dimethyl ether, melting point 283–285° C. (dec.), $[\alpha]_D^{25}$ +184 (0.5% in CHCl₃).

EXAMPLE 14

*Preparation of 16-N,N-Diethylaminoethylaminomethylene Estrone Methyl Ether Hydrochloride*

A solution of 700 mg. of 16-N,N-diethylaminoethyl-aminomethyleneestrone methyl ether (Table I, entry 5) in 20 cc. of ether is treated with 10 cc. of ether saturated with hydrogen chloride. Upon clarification of the milky solution by the addition of absolute alcohol, a crystalline product separates after chilling. Filtration gives 500 mg. (61%) of product, melting point 176–177° C. dec., $[\alpha]_D^{25}$ +137° (0.8% in CHCl₃).

EXAMPLE 15

*Preparation of 16-N,N-Diethylaminoethylaminomethylene Estrone Methyl Ether Methiodide*

A suspension of 1 g. of 16-N,N-diethylaminoethylamino-methyleneestrone methyl ether in 5 cc. of methyl iodide is warmed on the steam bath with swirling for approximately 5 minutes. The solution is evaporated to dryness under reduced pressure and the residue is recrystallized from methanol-ether to give 875 mg. (65%) of product as a methanolate, melting point 156–160° C. (gas). Three recrystallizations from absolute alcohol-ether gives white crystals, melting point 223–225° C., $[\alpha]_D^{25}$ +66° (0.5% in CHCl₃).

EXAMPLE 16

*Preparation of 16-Chloromethyleneestrone Methyl Ether*

A solution of 1 g. of 16-hydroxymethyleneestrone methyl ether and 3 cc. of thionyl chloride is allowed to stand at room temperature for 45 minutes. The resulting red solution is poured into an ice cold 10% sodium hydroxide solution (200 cc.) with stirring. After 30 minutes the solid collected by filtration and recrystallized from benzene-methanol to give 760 mg. (72%) of product, melting point 134–135° C. Two recrystallizations from ether-methanol gives white crystals, melting point 136–137° C., $[\alpha]_D^{25}$ +93° (1% in CHCl₃).

EXAMPLE 17

*Preparation of 16-Isobutoxymethyleneestrone Methyl Ether*

A suspension of 1 g. of 16-hydroxymethyleneestrone methyl ether, 60 mg. of p-toluenesulfonic acid and 3 cc. of isobutyl alcohol in 30 cc. of reagent benzene is refluxed for 18 hours, solution being complete at the boiling point. The water formed is removed by means of a Dean-Stark distilling receiver. The cooled solution is washed with saturated sodium bicarbonate solution, water, dried with anhydrous magnesium sulfate and evaporated to dryness under reduced pressure. The resulting solid is triturated with petroleum ether (boiling point 60–70° C.) and collected to give 838 mg. (71%) of product in two crops, melting point 123–127° C. Recrystallization from petroleum ether gives white crystals, melting point 126–128° C., $[\alpha]_D^{25}$ +96° (2.3% in CHCl₃).

EXAMPLE 18

*Preparation of 16-n-Propylthiomethyleneestrone Methyl Ether*

Treatment of a suspension of 1 g. of 16-hydroxymethyleneestrone methyl ether and 60 mg. of p-toluenesulfonic acid in 30 cc. of reagent benzene with 2 cc. of of n-propylmercaptan as described above for the preparation of 16-isobutoxymethyleneestrone methyl ether gives 671 mg. (57%) of product, melting point 137–138° C. Recrystallization from petroleum ether (boiling point 60–70° C.) gives white crystals, melting point 137–138° C., $[\alpha]_D^{25}$ +126° (2.2% in CHCl₃).

We claim:

1. A compound of the formula:

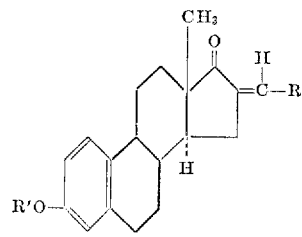

wherein R' is lower alkyl and R is a radical selected from the group consisting of lower alkylthio, isobutoxy, halogen, 3-lower alkoxy-17-oxo-1,3,5(10)-estratriene - 16-ylidenemethylthio and N[3-lower alkoxy-17-oxo - 1,3,5 (10)-estratrien - 16 - ylidenemethyl]azopentamethyleneimino radicals.

2. The compound 16,16'-(thiomethylidyne)-diestrone dimethylether.

3. The compound 16,16'-(piperazin-1,4-diyldimethylidyne)-diestrone dimethyl ether.

4. The compound 16-chloromethyleneestrone methyl ether.

5. The compound 16-isobutoxymethyleneestrone methyl ether.

6. The compound 16-n-propylthiomethyleneestrone methyl ether.

References Cited in the file of this patent

UNITED STATES PATENTS 3,030,357     Clinton _____ Apr. 17, 1962

UNITED STATES PATENT OFFICE
CERTIFICATE OF CORRECTION

Patent No. 3,091,609 May 28, 1963

Robert E. Schaub et al.

It is hereby certified that error appears in the above numbered patent requiring correction and that the said Letters Patent should read as corrected below.

Column 2, line 27, for "28" read -- 48 --; lines 69 and 70, for "aminoethylene" read -- aminomethylene --.

Signed and sealed this 10th day of December 1963.

(SEAL)
Attest:
ERNEST W. SWIDER

Attesting Officer

EDWIN L. REYNOLDS

Acting Commissioner of Patents